United States Patent [19]

Lew

[11] Patent Number: 4,807,481

[45] Date of Patent: * Feb. 28, 1989

[54] THREE-IN-ONE VORTEX SHEDDING FLOWMETER

[76] Inventor: Hyok S. Lew, 7890 Oak St., Arvada, Colo. 80005

[*] Notice: The portion of the term of this patent subsequent to Mar. 1, 2005 has been disclaimed.

[21] Appl. No.: 31,902

[22] Filed: Mar. 30, 1987

Related U.S. Application Data

[63] Continuation-in-part of Ser. No. 920,977, Oct. 20, 1986, Pat. No. 4,754,649, and a continuation-in-part of Ser. No. 922,850, Oct. 24, 1986, Pat. No. 4,727,756, and a continuation-in-part of Ser. No. 12,680, Feb. 9, 1987.

[51] Int. Cl.$^4$ .............................................. G01F 1/32
[52] U.S. Cl. .................................................. 73/861.24
[58] Field of Search ........... 73/861.22, 861.23, 861.24, 73/DIG. 4

[56] References Cited

U.S. PATENT DOCUMENTS

| | | | |
|---|---|---|---|
| 3,756,078 | 9/1973 | Yamasaki et al. | 73/861.23 |
| 4,048,854 | 9/1977 | Herzl | 73/861.04 |
| 4,094,194 | 6/1978 | Herzl | 73/861.24 |
| 4,727,756 | 3/1988 | Lew | 73/861.24 |

OTHER PUBLICATIONS

"Streak Lines in the Wake Behind a Circular Cylinder", (Photo. by Homann, 1936): copied from an Introduct. to Fluid Dynamics by G. K. Batchelor.
Product brochure from Fisher-Porter on "V3 Vortex Shedd. Flowmeter", Fisher-Porter Pub. No. 23640.
Product brochure from Fisher-Porter on "LV-2 Vortex Shedd. Flowmeter", Fisher-Porter Pub. No. 22834.

Primary Examiner—Michael J. Tokar
Assistant Examiner—Robert P. Bell

[57] ABSTRACT

This invention discloses a three-in-one flowmeter that measures volume flow rate, mass flow rate and the density of the fluid, which flowmeter comprises a vortex generator of an elongated shape having a blunt upstream side disposed across a first cross section of the flow passage, a vortex sensor having the shape of a wing disposed across a second cross section of the flow passage and a transducer converting the alternating lift forces exerted on the vortex sensor by the vortices generated by the vortex generator to an alternating electric signal, wherein the wing sensor is connected to a force receiving member extending from the transducer by a mechanical coupling. The volume flow rate is determined from the frequency of the signals as the fluid velocity is proportional to the frequency at which the vortices are generated by the vortex generator. The mass flow rate is determined by combining the frequency and the amplitude of the signals as the frequency is proportional to the fluid velocity and the amplitude is proportional to the dynamic pressure that is equal to one half of the fluid density times the square of the fluid velocity. The fluid density is obtained as the ratio of the mass flow rate divided by the volume flow rate. The combination of the wing sensor and the transducer includes self-calibrating means for accurately measuring the amplitude of the lift forces generated by the vortices independent of the drift in the characteristics of the transducer.

26 Claims, 3 Drawing Sheets

THREE-IN-ONE VORTEX SHEDDING FLOWMETER

BACKGROUND OF THE INVENTION

This patent application is a continuation-in-part application to patent application Ser. No. 920,977 entitled "Tandem Wing Universal Vortex Shedding Flowmeter" filed on Oct. 20, 1986, now U.S. Pat. No. 4,754,649 Ser. No. 922,850 entitled "Vortex Shedding Flowmeter with Lever Action Signal Amplification" filed on Oct. 24, 1986, which is now U.S. Pat. No. 4,727,756 and Ser. No. 012,680 entitled "Vortex Shedding Flowmeter with Mechanically Amplifying Pressure Sensor" filed on Feb. 9, 1987.

Advanced flow measurement technology is the key to successful process automation in chemical, phaarmaceutical and mineral processing industries. The state of the art in present day flow measurement technology may be summarized by pointing out that the flowmeters of high accuracy and reliability are expensive as those high technology flowmeters require advanced manufacturing technology and expensive electronic hardware, while the economically priced flowmeters are usually poor in performance. Without any exception, all existing flowmeters are single duty instruments as each flowmeter is designed and operated to measure a single flow variable which may be the volume flow rate or mass flow rate, or fluid density or pressure. Multiple duty instruments such as the present invention will bring forth a revolution in the flow measurement technology and processing industries by economizing the cost per function in the flow measurements and by simplifying the flow measurement process as many flow variables can be measured by a single instrument.

BRIEF SUMMARY OF THE INVENTION

The primary object of the present invention is to provide a vortex shedding flowmeter that simultaneously measures the volume flow rate and mass flow rate of the fluid.

Another object is to provide a three-in-one vortex shedding flowmeter that measures the volume flow rate, mass flow rate and the density of the fluid at the same time.

A further object is to provide a multi-function vortex shedding flowmeter comprising a vortex generator including a bluff body, and a vortex sensor including a vortex sensing wing connected to a transducer by a mechanical coupling providing a mechanical amplification of the vortex signals detected by the vortex sensing wing.

Yet another object is to provide a multi-function vortex shedding flowmeter that includes a calibration means for checking the relationship between the strength of the vortices and the amplitude of the electric signals generated by the transducer.

Yet a further object is to provide a multi-function vortex shedding flowmeter comprising a vortex generator including a bluff body, and a vortex sensor including a vortex sensing wing with at least one extremity secured to the wall of the flow passage and the other extremity connected to the transducer by a mechanical coupling such as a pivoting joint.

Still another object is to provide a multi-function vortex shedding flowmeter comprising a vortex generator including a bluff body and a vortex sensor including tandem vortex sensing wings wherein the two lift forces respectively exerted on the two wings in the two opposing directions create pivoting motions of a lever disposed intermediate and connected to the two wings.

Still a further object is to provide a multi-function vortex shedding flowmeter comprising a pressure sensing panel enclosed within a cavity included in the vortex generating bluff body.

These and other objects of the present invention will become clear as the description thereof proceeds.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
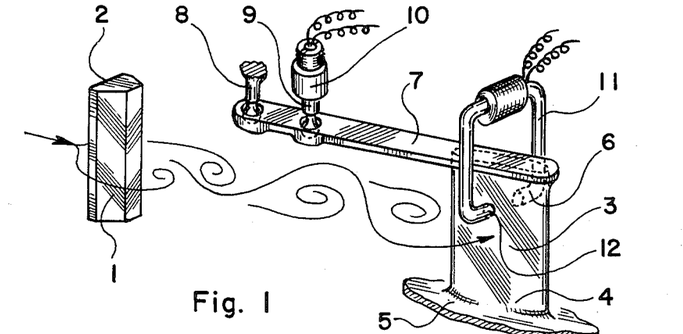
FIG. 1 illustrates a perspective view of an embodiment of the present invention showing the principles of operations by a schematic drawing.
Figure 7:
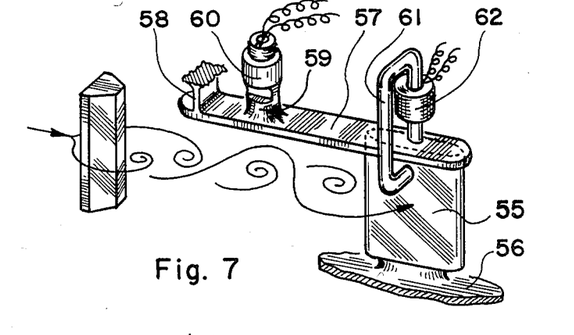
FIG. 7 illustrates a perspective view of another embodiment of the vortex shedding flowmeter of the present invention.

In FIG. 1 there is illustrated a perspective view of a schematic arrangement of an embodiment of the vortex shedding flowmeter constructed in accordance with the principles of the present invention. The vortex generator comprises a bluff body 1 of an elongated shape having a blunt face 2 disposed generally perpendicular to the direction of the fluid flow, which bluff body 1 is disposed across a first cross section of the flow passage. The vortex sensor comprises a vortex sensing wing 3 disposed across a second cross section of the flow passage downstream to the first cross section, wherein the chord of the vortex sensing wing 3 is disposed generally parallel to the direction of the fluid flow. One extremity 4 of the vortex sensing wing 3 is secured to the wall 5 of the flow passage, while the other extremity 6 of the vortex sensing wing 3 is secured to one extremity of a lever member 7 disposed generally parallel to the direction of the fluid flow. The other extremity of the lever member 7 is pivotably secured to the wall of the flow passage by a pivotable support 8 functioning as a fulcrum. A transmitter member 9 extending from the container vessel 10 housing a transducer is connected to the lever member 7 intermediate the two extremities thereof. It should be understood that the same object as that of the particular arrangement shown in FIG. 1 can be obtained when the transmitter member 9 is connected to the other extremity of the lever member 7 where the pivotable support 8 is disposed while the pivotable support 8 is now disposed intermediate the two extremities of the lever member 7 at a location where the transmitter member 9 is connected. The electromagnet 11 with at least one pole 12 disposed adjacent to the surface of the vortex sensing wing 3 near the other extremity 6 secured to the lever member 7 is secured to the wall structure of the flow passage. It should be mentioned tht the pivotable support 8 securing the other extremity of the lever member 7 to the wall structure of the flow passage and the connection of the transmitter member 9 to the lever member 7 may employ swivel joints including a ball and socket combination as shown in the particular embodiment shown in FIG. 1 or simple pivotable joints or semi-fixed joints as shown in FIG. 7.

Figures 2, 3, 5:
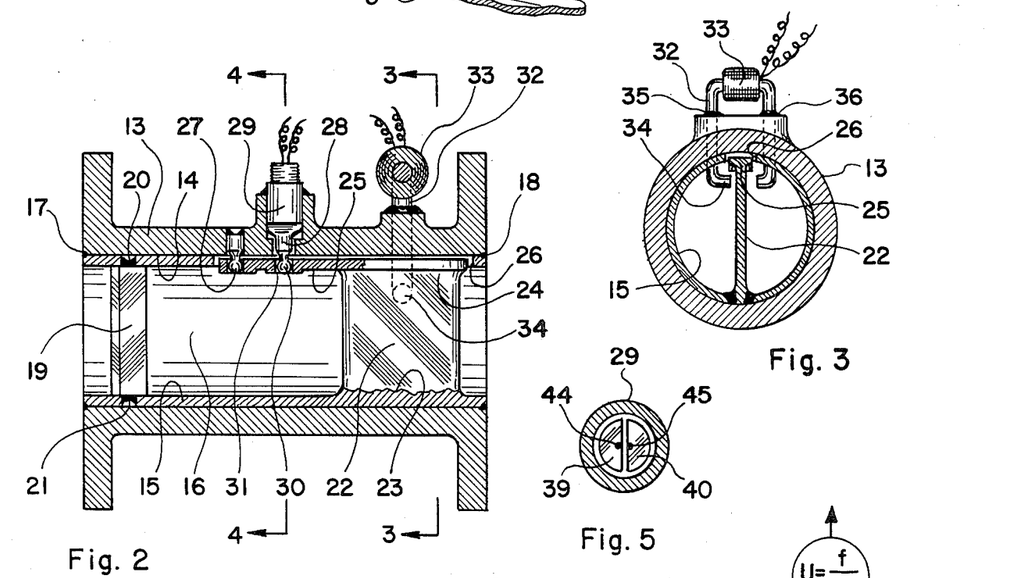
FIG. 2 illustrates a cross section of an embodiment of the in-line vortex shedding flowmeter of the present invention employing the principles illustrated in FIG. 1.
FIG. 3 illustrates another cross section of the embodiment shown in FIG. 2.
FIG. 5 illustrates another cross section of the embodiment of the transducer shown in FIG. 4.

In FIG. 2 there is illustrated a cross section of an embodiment of an in-line vortex shedding flowmeter of the present invention employing the structural arrangement schematically illustrated in FIG. 1. The flowmeter body 13 includes a bore 14 extending from one extremity to the other extremity thereof. A tubular sleeve 15 providing the flow passage 16 therein is fitted into the bore 14 and fastened to the body 13 of flowmeters by weldings 17 and 18. The vortex generating bluff body 19 disposed across one cross section of the flow passage 16 adjacent to one extremity of the flowmeter body 13 is anchored to the tubular sleeve 15 by weldings 20 and 21, while the vortex sensing wing 22 disposed across another cross section of the flow passage 16 adjacent to the other extremity of the flowmeter body 13 in a relationship generally parallel to the bluff body 19 is secured to the tubular sleeve 15 at one extremity 23 thereof. The other extremity 24 of the vortex sensing wing 22 is connected to one extremity of the lever member 25 disposed within a slot 26 cut out through the wall of the tubular sleeve 15 in a direction parallel to the central axis of the flow passage. The other extremity of the lever member 25 is pivotably supported by a pivotable joint 27 secured to the flowmeter body 13. The transmitter member 28 extending from the container vessel 29 housing a transducer includes a ball end 30 that engages a socket 31 included in the lever member 25 is a close tolerance. The core 32 of the electromagnet 33 extends through the wall of the flowmeter body and the tubular sleeve and into the flow passage 16, wherein at least one pole 34 thereof terminates at a close proximity to the surface of the vortex sensing wing. It should be mentioned that the other extremity of the lever member 25 may be pivotably secured to the wall of the tubular sleeve 15 instead of the flowmeter body 13, wherein a ball or button end affixed to the other extremity of the lever member 25 pivotably engages a key-hole shaped hole included in the closed end of the slot 26. In place of the combination of the ball 30 and socket 31 included in the connection between the transmitter member 28 and the lever member 25, a threaded joint or welded joint may be employed in the connection of the free end of the transmitter member 28 to the lever member 25. The vortex sensing wing 22 extending from the wall of the tubular sleeve 15 may be weld connected to the wall of the tubular sleeve or the combination may be cast or forged in one piece.

In FIG. 3 there is illustrated another cross section of the embodiment shown in FIG. 2 which cross section is taken along plane 3—3 as shown in FIG. 2. The core of the electromagnet 33 extending through the wall of the flowmeter body 13 is welded to the flowmeter body by welds 34 and 36 in a leak proof manner. The two poles of the electromagnet 33 are terminated at two unequal distances from the two opposite sides of the vortex sensing wing 22, whereby the vortex sensing wing 22 experiences a net lateral force exerted by the electromagnet 33.

Figure 4:
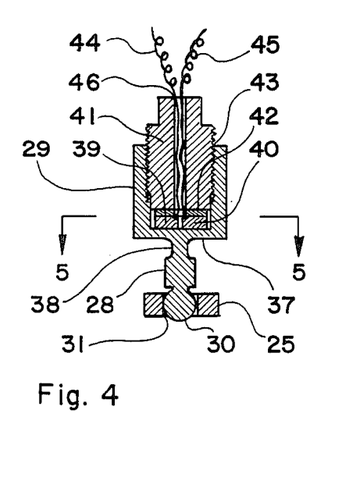
FIG. 4 illustrates a cross section of an embodiment of a transducer usable in conjunction with the vortex shedding flowmeter of the present invention.

In FIG. 4 there is illustrated a cross section of the transducer assembly comprising the transmitter member 28, the container 29 and the transducer elements enclosed therein, which cross section is taken along plane 4—4 perpendicular to the central axis of the flow passage 16 as shown in FIG. 2. The transmitter member 28 extending from the thin flange 37 included in the container vessel 29 includes a web 38 disposed parallel to the central axis of the flow passage 16 and extending completely across the thin flange 37 at the root thereof, which web provides structural support for the thin flange against forces loading the thin flange 37 in directions perpendicular thereto, while the free end of the transmitter member 28 includes connection means such as the combination of the ball 30 and socket 31 or other connection means such as a threaded or welded connection means, which connects the free end of the transmitter member 28 to the lever member 25 in a pivoting or fixed relationship. The transducer means contained in the container vessel 28 comprises a pair of piezoelectric elements 39 and 40 under a pressurized contact with the thin flange 37, which pair are disposed in a mirror image to one another about a plane generally parallel to the central axis of the flow passage 16 and generally perpendicular to the thin flange 37. The two Piezo electric elements 39 and 40 isolated from the threaded plug 41 by a insulator 42 are pressed onto the thin flange 37 by the threaded plug 41 plugging up the opening 43 of the container vessel 29. A pair of conducting wires 44 and 45 respectively connected to the two Piezo electric elements 39 and 40 are routed through an axial hole 46 included in the threaded plug 41.

In FIG. 5 there is illustrated another cross section of the transducer assembly shown in FIG. 4, which cross section is taken along plane 5—5 as shown in FIG. 4. In general, it is desirable to electrically isolate the electrodes connected to the wires 44 and 45 from the container vessel 29 and the threshold plug 41, while the other electrodes of the Piezo electric elements 39 and 40 are grounded to the thin flange 37. The two Piezo electric elements 39 and 40 are polarized in the same direction. The side to side pivoting movements of the lever member 25 about the pivotable support 27, which are created by the alternating lift forces on the vortex sensing wing 22 exerted by the vortices shed from the vortex generating bluff body 19, are converted to the pivoting movements of the transmitter member 28 about an axis generally coinciding with the line of intersection between the thin flange 37, and the web 38, wherein these pivoting motions impose alternating pressure loadings on the two Piezo electric elements which generate alternating electromotive forces between the two Piezo electric elements and, consequently, alternating electric currents in the wires 44 and 45. It should be mentioned that the Piezo electric assembly shown in FIGS. 4 and 5 are only one of many transducers embodiments usable in the detection of the alternating lift forces on the vortex sensing wing exerted by the vortices shed from the vortex generating bluff body. Other types of transducers operating on principles of strain gauges, electromagnetic induction or capacitance sensors may be used in detecting the pivoting motion of the lever member 25 in place of the Piezo electric transducer illustrated in FIGS. 4 and 5. Therefore, the present invention as claimed in the present patent application is not limited to an embodiment using the Piezo electric transducer.

Figure 6:
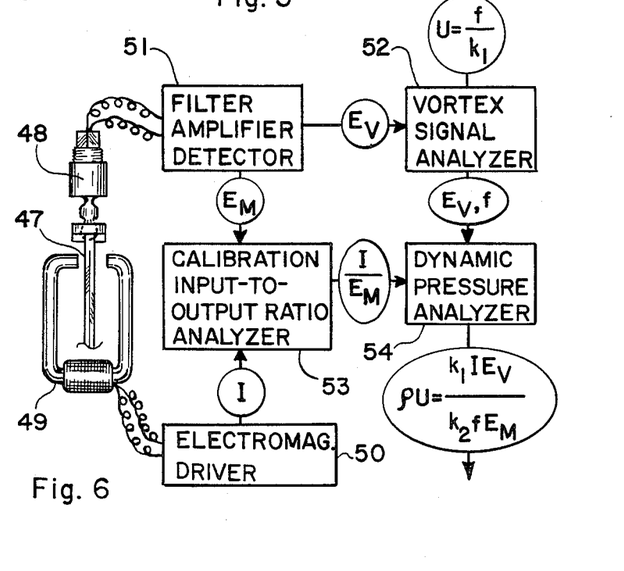
FIG. 6 illustrates a block diagram showing the flow and processing of signals generated by the combination of the vortex sensor and the transducer.

In FIG. 6 there is illustrated a block diagram illustrating the flow and processing of the vortex signals generated by the combination of the vortex sensing wing 47 and the transducer assembly 48. It is a well established fact that the vortex shedding frequency at which the vortices are shed from the vortex generating bluff body is directly proportional to the fluid velocity, i.e., $$f = S_t \frac{U}{b}, \quad (1)$$

where f is the vortex shedding frequency, $S_t$ is a dimensionless constant known as the Strouhal number, b is the width of the bluff body and U is the fluid velocity. It is well known that the lift force on a wing exerted by moving fluid is proportional to the dynamic pressure of the fluid flow that is equal to one half of the density of the fluid times the square of the fluid velocity, i.e., $$L = \frac{C_L}{2} \rho U^2, \quad (2)$$

where L is the lift force, $C_L$ is the lift coefficient of the entire wing, $\rho$ is the fluid density and U is the fluid velocity. If all elements included in the combination of the vortex sensing wing 41 and the transducer assembly 48 are assembled in a perfectly ideal arrangement, the amplitude of the alternating electric signals from the transducer should be proportional to the lift force on the vortex sensing wing, i.e., $$E_v = A \frac{C_L}{2} \rho U^2, \quad (3)$$

where $E_v$ is the amplitude of the electromotive force from the transducer that is generated by the vortices and A is a constant of proportionality. Due to the imperfection of the elements included in the combination of the vortex sensing wing and the transducer assembly, the actual relationship between the amplitude of the vortex signals and the fluid velocity is given by equation $$E_v = B(U)\rho U^n, \quad 1.3 < n < 3.0, \quad (4)$$

where B (U) is a quasi-constant of proportionality that may be a very weak function of the fluid velocity U. From equations (1) and (4), one can derive the following relationships:

$$U = \frac{f}{k_1}, \text{ where } k_1 = \frac{S_t}{b} \text{ ; a constant,} \quad (5)$$

$$\rho U = \frac{E_v}{C(f)} \left( \frac{k_1}{f} \right)^{n-1}, \text{ where } C(f) = B(U), \quad (6)$$

C(f)=B(U) is the ratio of the electric output from the transducer assembly 48 to the fluid dynamic input to the vortex sensing wing 47, which ratio can drift in time due to the aging of the mechanical as well as electronic components. In a relation parallel to equation (4), the amplitude $E_M$ of the electromotive force from the transducer that is generated by the electromagnet 49 driven by an alternating current of frequency f and amplitude equal to I(f) will be given by equation $$E_{M(f)} = \frac{1}{k_2} C(f)I(f), \quad (7)$$

where $k_2$ is a constant of proportionality. Solving equation (7) for C(f) and substituting it into equation (6) yields the equation $$\rho U = \frac{I(f)}{k_2} \frac{E_v}{E_{M(f)}} \left( \frac{k_1}{f} \right)^{n-1}, \quad (8)$$

which reduces to equation when n is equal 2

$$\rho U = \frac{k_1}{k_2} \frac{E_v}{f} / \frac{E_{M(f)}}{I(f)}. \quad (9)$$

If the characteristics of the mechanical and electronic components included in the combination of the vortex sensing wing, the transducer assembly, and the electronic data processor remain constant, the volume flow and mass flow of the fluid are respectively determined by equations (5) and (6), where $k_1$, n and C(f) are empirically determined by the initial calibration of the flowmeter and entered into the memory of the electronic data processor. When the characteristics of the mechanical and electronic components drift in time, the volume flow and mass flow are respectively determined by equations (5) and (8), where $k_1$, n and $k_2$ are empirically determined by the initial calibration of the flowmeter and entered into the memory of the electronic data processor. Any drift in C(f) is continuously and automatically corrected by the factor I(f)/$E_M$(f) that is continuously updated. If this factor is dependent on the frequency, the electromagnetic drive 50 energizing the electromagnet 49 has to sweep the frequencies over the range of the operating frequencies in order to generate the data required to update the value of this factor in continuous or intermittent mode. If this factor is independent of the frequency, the electromagnetic drive 50 may operate on a fixed frequency outside of the range of operating frequencies in continuous or intermitent mode. In most of the actual cases, the drift in $I(f)/E_M(f)$ is uniform in the range of operating frequencies and, consequently, $I(f)/E_M(f)$ can be separated into a first nondrifting and frequency dependent part, and a second frequency independent and drifting part $$\frac{I(f)}{E_M(f)} = g_0(f)\left(\frac{I}{E_M}\right)_{fT},\tag{10}$$

where $g_0(f)$ is a nondrifting predetermined function of the frequency, while $(I/E_M)_{fT}$ is a frequency independent factor that drifts, which can be continuously or intermitently updated by taking the values of I and $E_M$ by energizing the electromagnet 49 with alternating currents of a constant test frequency well outside of the range of operating frequencies.

In order to determine the amplitude of the alternating lift forces on the wing sensor from the amplitude of the electromotive forces generated by the transducer, one has to know the ratio therebetween, which ratio is called "input-to-output (ITO) ratio." If ITO ratio is independent of time (not drifting in time), it can be determined empirically by calibrating the flowmeter and is stored in the data processor memory as a constant or as a function of frequency depending whether it depends or not on the frequency. If ITO ratio drifts in time, it is necessary to update the numerical value or functional relationship thereof on an intermittent or continuous basis, or an off-operation or on-operation basis. The off-operation calibration requires the shut down of the fluid flow through the flowmeter and obtain new ITO ratio under a frequency sweep and store it into the processor memory, and then turn on the flow through the flowmeter. Of course, if the drift is uniform over the operating frequencies, the new ITO ratio may be determined for a single value of the frequency instead of the frequency sweep. The on-operation calibration requires the determination of the new ITO ratio without shutting off the flow while the flowmeter continuously measures the flow rate therethrough. If the drift is uniform over the operating frequencies, the electromagnet is energized at a fixed frequency outside the operating frequency (below the operating frequency is preferred for gas flow and above the operating frequency is preferred for liquid flow) and the emf generated by the electromagnet is isolated from the vortex signals through a narrow band width filter or frequency controlled switch, wherefrom the new ITO ratio is determined. If the drift is frequency dependent, the electromagnet is energized in a frequency sweep mode that generates output emf in the same frequency sweep mode, which output emf is superimposed on the vortex signals being generated at a frequency $f_o$. The data analizer for the calibration can be programmed in such a way that the value of the vortex frequency $f_o$ is stored thereinto moment before the frequency sweep and then omit a portion of the output emf spectrum in a small neighborhood of $f_o$. By applying a smooth curve fitting algorithm, the missing portion of the output emf spectrum about $f_o$ is reconstructed and the continuous output emf spectrum is obtained, which provides new ITO function that defines the updated relationship between the input fluid dynamic forces and output vortex signals over the entire operating frequencies. The amplitude of the electric current energizing the electromagnet may be a fixed predetermined value or a fixed value selected in comparison with the vortex signal amplitude being generated in accordance with a preprogrammed algorithm.

For example, the electric signals from the transducer 48 are the sum of the signals generated by the vortices and the signals generated by the electromagnet 49 operating at a fixed frequency outside the range of the vortex frequencies. The signal detector 51 separates the signals into the vortex signals $E_v$ and the electromagnet signals $E_M$. The volume flow data processor 52 determines the fluid velocity U of the volume flow of the fluid from the frequency of the vortex signal per equation (5). The calibration data processor 53 determines the calibration factor $I/E_M$ from the value of $E_M$ supplied by the signal detector and the vlaue of I supplied by the electromagnetic drive 50 driving the electromagnet 49. The mass flow data processor 54 determines the mass flow rate from the amplitude of the vortex signal $E_v$ and the calibration factor $I/E_M$ wherein the stored information on $k_1$, $k_2$ and $g_0(f)$ as defined by equation (10) is included in the algorithm. The output from each electronic unit or block appears in circle on the arrow emerging therefrom. Therefore, the multi-function vortex shedding flowmeter having mechanical arrangements of FIG. 2 and electronic data processors schematically illustrated in FIG. 6 consistantly measures accurate values of the volume flow and mass flow independent of the drift in the characteristics of the mechanical and electronic components included in the construction thereof. Of course, the fluid density is readily obtained as the ratio of the mass flow to the volume flow. It should be mentioned that the combination of the electromagnet and electronic data processors performing the calibration function may operate in a continuous real time mode parallel to the continuous flow data acquisition, or may be operated intermittently on automatic or manual switching mode wherein it regularly updates and stores information on calibration.

In FIG. 7 there is illustrated another embodiment of the vortex shedding flowmeter of the present invention having essentially the same construction as that shown in FIG. 1 with the following exceptions: One extremity of the vortex sensing wing 55 is secured to the wall structure 56 of the flow passage in a fixed or semi-fixed arrangement that allows a greater lateral flexibility for the wing; the lever member 57 is elastically supported at one extremity by a leaf spring support 58 that allows pivoting movements of small magnitude for the lever member 57 while it prevents any lateral movements thereof; and the transmitter member 59 extending from the transducer container vessel 60 is connected to the lever member by a fixed or semi-fixed joint instead of a pivoting or swivel joint. The core 61 of the electromagnet 62 is arranged in such a way that the vortex sensing wing 55 made of a ferromagnetic material provides a passage for magnetic flux as one pole of the electromagnet is disposed adjacent to the lifting surface of the wing 55 while the other pole is disposed adjacent to the extremity of the wing 55 connected to the lever member 57. It should be mentioned that one or more of the elastic, fixed or simi-fixed joints employed in securing the vortex sensing wing 55 to the wall 56 or those securing the lever member 57 to the wall of the flow passage or to the transmitter member 59 may be replaced by pivoting or swivel joints as illustrated in the embodiments shown in FIG. 1.

Figure 8:
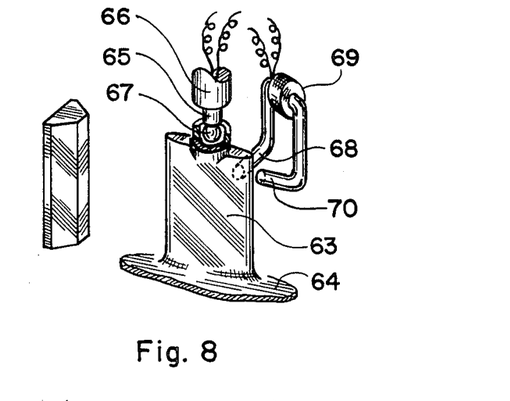
FIG. 8 illustrates a perspective view of a further embodiment of the vortex shedding flowmeter of the present invention.

In FIG. 8 there is illustrated a further embodiment of the vortex shedding flowmeter of the present invention that has a construction similar to and operates on the same principles as the the embodiments shown in FIGS. 1 and 7. In this embodiment, the vortex sensing wing 63 secured to the wall structure 64 of the flow passage at one extremity is connected to the transmitter member 65 extending from the transducer container vessel 66 at the other extremity thereof by a pivoting or swivel joint 67 such as a ball and socket joint or other type of pivoting joint. One pole 68 of the electromagnet 69 is disposed adjacent to a lifting surface of the wing 63, while the other pole 70 is disposed adjacent to an edge of the wing 63, wherein the wing 63 made of a ferro-magnetic material provides a magnetic flux passage. The swivel or pivoting joint 67 connecting the free extremity of the vortex sensing wing 63 to the free extremity of the transmitter member 65 may employ an elastic or flexible joint instead of the pivoting or swivel joint.

Figure 9:
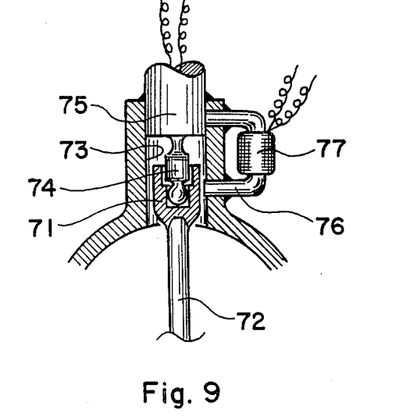
FIG. 9 illustrates a cross section of yet another embodiment of the vortex sensing wing included in the vortex shedding flowmeter of the present invention.

In FIG. 9 there is illustrated yet another embodiment of the vortex shedding flowmeter of the present invention that has essentially the same construction as the embodiment shown in FIG. 8 with two exceptions being that the socket 71 disposed at the free extremity of the vortex sensing wing 72 extends into a hole 73 accomodating the transmitter member 74 extending from the transducer container vessel 75. At least one pole 76 of the electromagnet 77 is disposed adjacent to the outer wall of the socket 71, whereby the electromagnet 77 energized by alternating electric current creates alternating lateral flexing movements of the vortex sensing wing 72.

Figure 10:
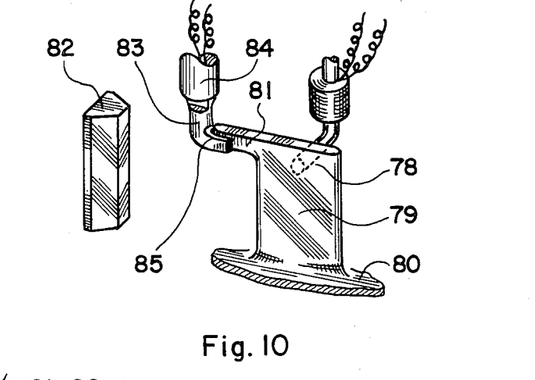
FIG. 10 illustrates a perspective view of yet a further embodiment of the vortex shedding flowmeter of the present invention.

In FIG. 10 there is illustrated yet a further embodiment of the vortex shedding flowmeter of the present invention having essentially the same construction as the embodiment illustrated in FIG. 8 with one exception being that the free extremity 78 of the vortex sensing wing 79 extending from the wall 80 of the flow passage includes an angled extension 81 extending towards the vortex generating bluff body 82, which extension 81 is connected or linked to the transmitter member 83 extending from the transducer container vessel 84 by a mechanical joint or linkage 85.

Figures 11, 12:
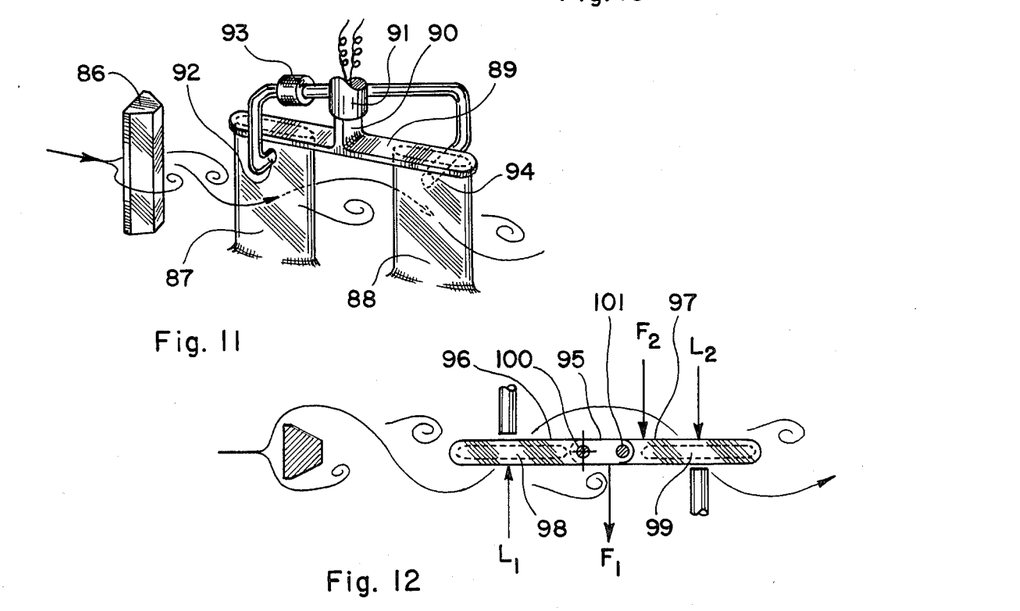
FIG. 11 illustrates a perspective view of an embodiment of the vortex shedding flowmeter of the present invention comprising tandem vortex sensing wings.
FIG. 12 illustrates a plan view of another embodiment of the vortex shedding flowmeter of the present invention comprising tandem vortex sensing wings.

In FIG. 11 there is illustrated a perspective view of an embodiment of the vortex shedding flowmeter with two vortex sensing wings disposed in tandem, which vortex shedding flowmeter is constructed in accordance with the principles of the present invention. The vortex generating bluff body 86 is disposed across a first cross section of the flow passage. A first vortex sensing wing 87 with one extremity secured to the wall structure of the flow passage extends across a second cross section of the flow passage downstream of the first cross section, while a third vortex sensing wing 88 with one extremity secured to the wall structure of the flow passage extends across a third cross section of the flow passage downstream of the second cross section. The free extremities of the two vortex sensing wings 87 and 88 are respectively connected to the two extremities of the lever member 89 disposed generally parallel to the central axis of the flow passage. The transmitter member 90 extending from the transducer container vessel 91 is nonrotatably connected to the midsection of the lever member 89, wherein the transducer converts the pivoting motion or torque on the lever member 89 into alternating electric signals. The two vortex sensing wings 87 and 88 are spaced from one another by a distance equal to an odd number integer times the half wave length of the sinuating streamlines generated by the vortices shed from the bluff body, whereby the lift forces on the two vortex sensing wings 87 and 88 are in two opposing directions. One pole 92 of the electromagnet 93 is disposed adjacent the one side of the first vortex sensing wing 87, while the other pole 94 is disposed adjacent to the other side of the second vortex sensing wing 88 opposite to the one side. The tandem vortex sensing wings provide an advantage in view that the inertia forces on the two wings generated by the flexural vibrations of the pipeline cancel out each other, while the lift forces on the two wings exerted by the vortices add up to generate clear and loud vortex signals.

In FIG. 12 there is illustrated another embodiment of the tandem wing vortex shedding flowmeter of the present invention having essentially the same construction as the embodiment shown in FIG. 11 with one exception. The lever member assembly 95 comprises two separate elongated members 96 and 97 respectively connected to the free extremities of the two vortex sensing wings 98 and 99. The other extremities of the two elongated members 96 and 97 overlap one another at the midsection of the lever member assembly 95, wherein the overlapping portions are supported by a common pivotable support secured to the wall structure of the flow passage and connected to a common transmitter member 101 extending from the transducer container vessel constructed and arranged in the same way as the corresponding elements shown in FIG. 1 or 7. Of course, the lever member assembly 95 may comprise a single lever member as illustrated in FIG. 11 instead of the two elongated members 96 and 97.

Figures 13, 14, 15:
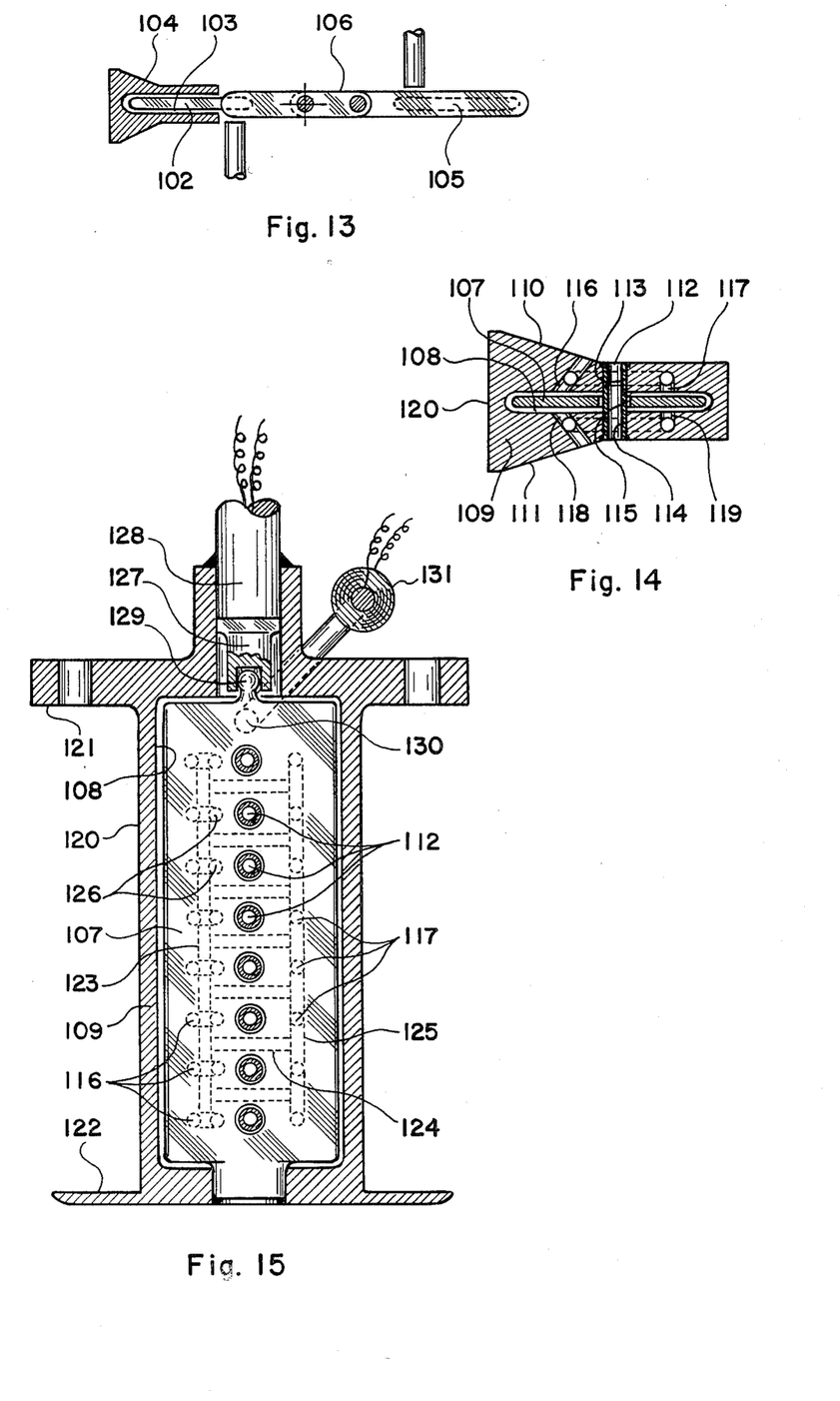
FIG. 13 illustrates a plan view of a further embodiment of the vortex shedding flowmeter of the present invention comprising tandem vortex sensing wings.
FIG. 14 illustrates a cross section of an embodiment of the vortex shedding flowmeter of the present invention comprising a pressure sensing panel enclosed within a cavity included in the vortex generating bluff body.
FIG. 15 illustrates another cross section of the embodiment of the vortex shedding flowmeter illustrated in FIG. 14.

In FIG. 13 there is illustrated a further embodiment of the tandem wing vortex shedding flowmeter of the present invention, which has essentially the same construction as the embodiment shown in FIG. 12 with one exception being that a major portion of the first vortex sensing wing 102 is disposed within a planar cavity 103 included in the vortex generating bluff body 104. The extremities of the vortex sensing wings 102 and 105 opposite to the extremities connected to the lever member assembly 107 are secured to the wall structure of the flow passage as shown in FIG. 11. In this particular embodiment, the lift force on the first vortex sensing wing 102 is generated by the alternating pressure difference across the two sides of the vortex generating bluff body 104, while the lift force on the second vortex sensing wing 105 is generated by the momentum transfer from the sinuating streamlines created by the vortices shed from the two sides of the bluff body 104 in an alternating pattern. The spacing between the two vortex sensing wings 102 and 105 should be such that the lift force on the first wing 102 generated by the pressure loading and the lift force on the second wing 105 generated by the sinuating streamlines are in two opposing directions.

In FIG. 14 there is illustrated a cross section of an embodiment of an insertion type vortex shedding flowmeter constructed in accordance with the principles of the present invention, which cross section is taken along a plane perpendicular to the longitudinal axis of the vortex shedding bluff body. The pressure sensor panel 107 is disposed within a planar cavity 108 included in the vortex generating bluff body 109, which planar cavity and pressure sensor panel are disposed generally parallel to the longitudinal axis of the bluff body and the direction of the fluid flow. The fluid pressure on the two sides 110 and 111 of the bluff body 109 communicate with one another through a plurality of pressure communicating holes 112 provided by tubings 113 engaging holes 114 extending from one side to the other side of the bluff body 109, wherein the two extremities of the tubings are welded to the two sides of the bluff body 109 in a flush arrangement while the tubings 112 engage and extend through the slightly oversized holes 115 disposed through the pressure sensor panel. A first set of a plurality of pressure transmitting holes 116 and 117 extending from one side 110 of the bluff body 109 to one side wall of the planar cavity 108 transmits the fluid pressure on the one side 110 of the bluff body 109 to the one side of the pressure sensor panel 107, while a second set of a plurality of holes 118 and 119 extending from the other side 111 of the bluff body 109 to the other side wall of the planar cavity 108 transmits the fluid pressure on the other side 111 of the bluff body 109 to the other side of the pressure sensor panel 107. The openings of the plurality of the pressure communicating holes 112 and the openings of the plurality of the pressure transmitting holes 116, 117, 118 and 119 emerging through the two sides 110 and 111 of the bluff body 109 are respectively disposed in lines generally parallel to the blunt leading face 120 of the bluff body.

In FIG. 15 there is illustrated another cross section of the embodiment shown in FIG. 14, which cross section is taken along a plane parallel to the longitudinal axis of the bluff body 109 and perpendicular to the pressure commumicating holes 112. The vortex generating bluff body 109 extends from an anchoring flange 121 may be secured to the wall of the flow passage at both extremities thereof or it may extend into the flow passage in a cantilever fashion. When the extremity of the bluff body 109 opposite to the anchoring flange 121 terminates in the middle of the flow passage, that extremity of the bluff body should include a flow guide plate 122 that prevents the fluid flow around that extremity of the bluff body 109. In this particular embodiment, the pressure transmitting holes 116 and 117 are connected to each other by the interconnecting holes 123, 124, 125, etc. The combination of these pressure communicating holes have a single series of openings 126 open to one side 110 of the bluff body 109, which openings are distributed along a line generally parallel to the leading face 120 of the bluff body 109. The pressure communicating holes 112 are distributed along another line generally parallel to the leading face 120 of the bluff body 109. It should be understood that the relative position between the openings 126 of the pressure transmitting holes and the openings of the pressure communicating holes 112 with respect to the leading face 120 of the bluff body 109 is interchangeable. It should be mentioned that the pressure communicating holes 112 are required in order to facilitate the shedding of the vortices from the two sides 110 and 111 of the bluff body 109 in a regular and alternating pattern, when the distance between the leading and trailing faces of the bluff body 109 is significantly greater than the width of the bluff body, otherwise the pressure commumicating holes are not required. Openings of the pressure transmitting holes breaking through the sides of the bluff body may be distributed on a single line generally parallel to the longitudinal axis of the bluff body or in a cluster distributed at a constant distance away from the leading face of the bluff body. One extremity of the pressure sensor panel 107 is secured to one extremity of the bluff body by a fixed or simple joint, while the other extremity adjacent to the anchoring flange 121 is connected to the transmitter member 127 extending from the transducer container vessel 128 affixed to a structure rigidly tied to the anchoring flange 121 by a pivoting or swivel joint 129 as shown in the particular embodiment illustrated in FIG. 15 or by other flexible or elastic joint. At least one pole 130 of the electromagnet 131 is disposed adjacent to one side surface of the pressure sensor panel 107, which pole may extend into the planar cavity 108 or terminate within the wall of the planar cavity 108. The alternating fluid pressures on the two sides of the bluff body associated with the vortices shed from the two sides of the bluff body in an alternating pattern produce pressure loading on the pressure sensor panel 107 that generates alternating lateral flexing motions of the pressure sensor panel 107, which motions are converted to electric signals by the transducer contained in the container vessel 128.

While the principles of the present invention have now been made clear by the illustrative embodiments, it will be immediately obvious to the skilled in the art many modifications of the structures, arrangements, proportions, elements and materials, which are particularly adapted to the specific working environments and operating conditions in practice of the invention without departing from those principles.

I claim:

1. An apparatus for measuring fluid flow comprising:
    (a) a body including a flow passage;
    (b) a vortex generator of an elongated cylindrical shape disposed across a first cross section of the flow passage; and
    (c) a planar member disposed generally parallel to the vortex generator across a second cross section of the flow passage on a plane generally parallel to the central axis of the flow passage, wherein at least one extremity of the planar member is secured to the wall of the flow passage in an isolated arrangement from the vortex generator; and
    (d) a transducer means secured to the body including a force transmitter member extending from the transducer means in an isolated arrangement from the vortex generator, wherein the force transmitter member is connected to the other extremity of the planar member opposite to said one extremity by a mechanical coupling;
wherein the transducer means provides signals related to alternating lift forces on the planar member exerted by vortices shed from two sides of the vortex generator in an alternating pattern as a measure of fluid flow through the flow passage.

2. The combination as set forth in claim 1 wherein the apparatus includes means for determining rate of volume flow through the flow passage from the frequency of the alternating lift forces on the planar member.

3. The combination as set forth in claim 2 wherein the apparatus includes means for determining rate of mass flow through the flow passage from a combination of the frequency and amplitude of the alternating lift forces on the planar member.

4. The combination as set forth in claim 3 wherein said combination includes means for exerting pulsed lateral force of known magnitude onto the planar member and for detecting amplitude of pulsed signal from the transducer means generated by said pulsed lateral force, wherein the ratio of the magnitude of said pulsed lateral force to the amplitude of said pulsed signal provides a basis for calibration of the apparatus.

5. The combination as set forth in claim 3 wherein the apparatus includes means for determining the density of fluid moving through the flow passage from the ratio of the mass flow rate to the volume flow rate.

6. The combination as set forth in claim 1 wherein said planar member includes an extension extending from said the other extremity of the planar member in a lateral relationship with respect to the planar member, wherein said extension is connected to the force transmitter by a mechanical coupling.

7. The combination as set forth in claim 6 wherein the apparatus includes means for determining rate of volume flow through the flow passage from the frequency of the alternating lift forces on the planar member.

8. The combination as set forth in claim 7 wherein the apparatus includes means for determining rate of mass flow through the flow passage from a combination of the frequency and amplitude of the alternating lift forces on the planar member.

9. The combination as set forth in claim 8 wherein said combination includes means for exerting pulsed lateral force of known magnitude onto the planar member and for detecting amplitude of pulsed signal from the transducer means generated by said pulsed lateral force, wherein the ratio of the magnitude of said pulsed lateral force to the amplitude of said pulsed signal provides a basis for calibration of the apparatus.

10. The combination as set forth in claim 8 wherein the apparatus includes means for determining the density of fluid moving through the flow passage from the ratio of the mass flow rate to the volume flow rate.

11. The combination as set forth in claim 1 wherein said planar member includes an extension extending from said the other extremity of the planar member in a lateral relationship with respect to the planar member, said extension comprising a fulcrum means securing said extension pivotably about an axis generally parallel to the planar member and generally perpendicular to the central axis of the flow passage, wherein said extension is connected to the force transmitter member by a mechanical coupling.

12. The combination as set forth in claim 11 wherein the apparatus includes means for determining rate of volume flow through the flow passage from the frequency of the alternating lift forces on the planar member.

13. The combination as set forth in claim 12 wherein the apparatus includes means for determining rate of mass flow through the flow passage from a combination of the frequency and amplitude of the alternating lift forces on the planar member.

14. The combination as set forth in claim 13 wherein said combination includes means for exerting pulsed lateral force of known magnitude onto the planar member and for detecting amplitude of pulsed signal from the transducer means generated by said pulsed lateral force, wherein the ratio of the magnitude of said pulsed lateral force to the amplitude of said pulsed signal provides a basis for calibration of the apparatus.

15. The combination as set forth in claim 13 wherein the apparatus includes means for determining the density of fluid moving through the flow passage from the ratio of the mass flow rate to the volume flow rate.

16. An apparatus for measuring fluid flow comprising:

(a) a body including a flow passage;

(b) a vortex generator of an elongated cylindrical shape disposed across a first cross section of the flow passage;

(c) a first planar member disposed generally parallel to the vortex generator across a second cross section of the flow passage on a plane generally parallel to the central axis of the flow passage, wherein one extremity of the first planar member is secured to the wall of the flow passage and the other extremity opposite to said one extremity is connected to a lever member disposed generally parallel to the central axis of the flow passage;

(d) a second planar member disposed parallel to the vortex generator across a third cross section of the flow passage on a plane generally parallel to the central axis of the flow passage, wherein one extremity of the second planar member is secured to the wall of the flow passage and the other extremity opposite to said one extremity is connected to a lever member disposed generally parallel to the central axis of the flow passage; and (e) a transducer means secured to the body including a transmitter member extending from the transducer means, wherein the transmitter member is connected to the lever members extending from the first and second planar member;

wherein the transducer means provides signals related to alternating lift forces on the first and second planar members exerted by vortices shed from two sides of the vortex generator in an alternating pattern as a measure of fluid flow through the flow passage.

17. The combination as set forth in claim 16 wherein the apparatus includes means for determining rate of volume flow through the flow passage from the frequency of the alternating lift forces on the first and second planar members.

18. The combination as set forth in claim 17 wherein the apparatus includes means for determining rate of mass flow through the flow passate from a combination of the frequency and amplitude of the alternating lift forces on the first and second planar members.

19. The combination as set forth in claim 18 wherein said combination includes means for exerting pulsed lateral force of known magnitude onto at least one of the first and second planar members and for detecting amplitude of pulsed signal from the transducer means generated by said pulsed lateral force, wherein the ratio of the magnitude of said pulsed lateral force to the amplitude of said pulsed signal provides a basis for calibration of the apparatus.

20. The combination as set forth in claim 18 wherein the apparatus includes means for determining the density of fluid moving through the flow passsage from the ratio of the mass flow rate to the volume flow rate.

21. An apparatus for measuring fluid flow comprising:

(a) a vortex generator of an elongated cylindrical shape disposed in a fluid stream generally perpendicular to the direction of fluid flow in a fixed stationary arrangement, said vortex generator including a planar cavity disposed along the length thereof, wherein two side walls of said planar cavity respectively includes two sets of pressure transmitting openings disposed therethrough and emerging through two sides of the vortex generator, respectively, and openings of each of the two sets of the pressure transmitting openings emerging through each side of the vortex generator are located along the length of the vortex generator;

(b) a planar member enclosed within said planar cavity in a closely spaced relationship wherein one extremity of the planar member is secured to the vortex generator;

(c) a transducer means secured to a structure of the vortex generator including a transmitter member extending from the transducer means, wherein the transmitter member is connected to the other extremity of the planar member opposite to said one extremity, wherein the transducer means provides signals related to alternating pressure forces on the planar member exerted by vortices shed from two sides of the vortex generator in an alternating pattern as a measure of fluid flow flowing by the vortex generator.

22. The combination as set forth in claim 21 wherein the apparatus includes means for determining rate of volume flow from the frequency of the alternating pressure forces on the planar member.

23. The combination as set forth in claim 22 wherein the apparatus includes means for determining rate of mass flow from a combination of the frequency and amplitude of the alternating pressure forces on the planar member.

24. The combination as set forth in claim 23 wherein said combination includes means for exerting pulsed lateral force of known magnitude onto said planar member and for detecting amplitude of pulsed signal from the transducer means generated by said pulsed lateral force, wherein the ratio of the magnitude of said pulsed lateral force to the amplitude of said pulsed signal provides a basis for calibrator of the apparatus.

25. The combination as set forth in claim 23 wherein the apparatus includes means for determining the density of fluid moving by the vortex generator from the ratio of the mass flow rate to the volume flow rate.

26. The combination as set forth in claim 21 wherein the vortex generator includes at least one pressure communicating opening extending from one side to the other side of the vortex generator and disposed along the length of the vortex generator.

* * * * *